(12) United States Patent
Pope et al.

(10) Patent No.: US 8,231,446 B2
(45) Date of Patent: Jul. 31, 2012

(54) ADJUSTABLE VANE SYSTEM FOR AN AXIAL FLOW ROTOR HOUSING OF AN AGRICULTURAL COMBINE

(75) Inventors: Glenn Pope, Viola, IL (US); Aaron Bruns, Davenport, IA (US)

(73) Assignee: Deere & Company, Moline, IL (US)

( * ) Notice: Subject to any disclaimer, the term of this patent is extended or adjusted under 35 U.S.C. 154(b) by 138 days.

(21) Appl. No.: 12/578,534

(22) Filed: Oct. 13, 2009

(65) Prior Publication Data

US 2010/0093413 A1 Apr. 15, 2010

Related U.S. Application Data

(63) Continuation of application No. 11/982,416, filed on Oct. 31, 2007, now abandoned.

(51) Int. Cl.
*A01F 12/28* (2006.01)
(52) U.S. Cl. .............................. 460/62; 460/84
(58) Field of Classification Search .................. 460/59, 460/62, 66, 71, 72, 79–81, 84, 107–110
See application file for complete search history.

(56) References Cited

U.S. PATENT DOCUMENTS

| | | | | |
|---|---|---|---|---|
| 3,648,710 | A * | 3/1972 | Rowland-Hill | 460/70 |
| 3,776,242 | A * | 12/1973 | Khan | 460/69 |
| 4,244,380 | A * | 1/1981 | DePauw et al. | 460/108 |
| RE31,257 | E * | 5/1983 | Glaser et al. | 460/80 |
| 4,541,441 | A * | 9/1985 | Ichikawa et al. | 460/66 |
| 4,875,891 | A * | 10/1989 | Turner et al. | 460/110 |
| 5,112,279 | A * | 5/1992 | Jensen et al. | 460/69 |
| 5,344,367 | A * | 9/1994 | Gerber | 460/68 |
| 5,445,563 | A * | 8/1995 | Stickler et al. | 460/69 |
| 5,688,170 | A * | 11/1997 | Pfeiffer et al. | 460/69 |
| 6,447,394 | B1 * | 9/2002 | Gryspeerdt | 460/109 |
| 7,070,498 | B2 * | 7/2006 | Grywacheski et al. | 460/68 |

* cited by examiner

*Primary Examiner* — Thomas B Will
*Assistant Examiner* — Mai Nguyen
(74) *Attorney, Agent, or Firm* — Erickson Law Group, PC

(57) ABSTRACT

An adjustable vane system for an axial-flow, rotary combine housing that incorporates at least one flat wall section as part of the otherwise cylindrical or oblong, curved housing cover, and adjustable vanes having flat bases that are angularly adjusted on the surface of the flat wall section. The housing includes fixed vanes on a curved portion of the housing cover that have a lead ends, in a direction of circumferential crop movement, substantially in registry with trailing ends of the adjustable vanes. The adjustable vanes include pivot connections near the trailing ends and swing connections near the lead ends of the adjustable vanes. All of the adjustable vanes are gang together and moved together. A mechanism is provided to swing the adjustable vanes from a position corresponding to the normal helical path of the fixed vanes to a bypass position wherein crop flow through the adjustable vanes will skip one or more passes between the fixed vanes on the next pass through the fixed vanes.

12 Claims, 7 Drawing Sheets

ADJUSTABLE VANE SYSTEM FOR AN AXIAL FLOW ROTOR HOUSING OF AN AGRICULTURAL COMBINE

This application is a continuation of U.S. application Ser. No. 11/982,416 filed on Oct. 31, 2007 now abandoned.

FIELD OF THE INVENTION

The invention relates to housings for axial-flow, rotary agricultural combines.

BACKGROUND OF THE INVENTION

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Rotary combines have one or two large rotors for threshing and separating the harvested crop material. In most rotary combines the rotor or rotors are arranged along the longitudinal axis of the machine. These rotors are provided with an infeed section for receiving harvested crop material, a threshing section for threshing the harvested crop material received from the infeed section and a separating section for freeing grain trapped in the threshed crop material received from the threshing section. Examples are shown in U.S. Pat. Nos. 5,445,563; 5,688,170 and 7,070,498.

It is well known to provide a housing for receiving a threshing and separating rotor with, secured to the inside of the housing, numerous guide vanes or bars which are arranged in a helical configuration. Conventionally, the guide vanes are fixed so that the rate of throughput of crop material can be varied only by changing the speed of rotation of the rotor.

U.S. Pat. No. RE31,257 describes an axial-flow rotary separator of the type which may be used in a combine harvester and in which crop material is propelled downstream in a generally helical path while being processed within a separator housing by use of adjustable internal guide vanes within the separator housing.

Adjusting guide vanes of this type may be used to vary the rate of axial progression of crop material through the separator so as to control the efficiency of threshing and separating. If, for example, excessive losses of grain in discharged straw occur, the crop material feed rate can be reduced by adjustment of the vanes such as, for example, varying the angle of inclination or the pitch of the vanes.

The present inventors have recognized one drawback to adjusting the angle of the vanes is that the vanes conform to a generally curved, cylindrical or oblong, separating section wall or cover. When the angle of the vanes is changed, the vanes no longer closely conform to the curvature of the wall and gaps can occur. Gaps can become clogged with crop material and make operation of the adjustable vanes difficult.

The present inventors have also recognized that angular movement of the adjustable vanes can change the generally cylindrical, curved shape of the separating section cover. This change can significantly change the characteristics of material flow for the section.

The present inventors have recognized that a need exists for providing a adjustable vane system for an axial-flow, rotary combine housing that could be easily and effectively adjusted and would not adversely affect the operating characteristics of the combine.

SUMMARY OF THE INVENTION

The present invention provides a adjustable vane system for an axial-flow, rotary combine housing that incorporates at least one flat wall section as part of the otherwise cylindrical or oblong, curved housing cover, and adjustable vanes having flat bases that are angularly adjusted on the surface of the flat wall section.

Preferably, the housing includes fixed vanes on a curved portion of the housing cover that have a lead ends, in a direction of circumferential crop movement, substantially in registry with trailing ends of the adjustable vanes. The adjustable vanes include pivot connections near the trailing ends and swing connections near the lead ends of the adjustable vanes.

Preferably, all of the adjustable vanes are ganged together and moved together. Although, independently moving less than all of the vanes is also encompassed by the invention. A mechanism is provided to swing the adjustable vanes from a position corresponding to the normal helical path of the fixed vanes to a bypass position wherein crop flow through the adjustable vanes is deflected to skip one or more passes between the fixed vanes on the next pass through the fixed vanes.

The vanes on the surface of the flat wall section are very easy to adjust, are easy to move, and seal effectively against the flat wall section throughout a range of position adjustment of the adjustable vanes.

Preferably, the flat wall section is contiguous with a further flat wall section, wherein the two flat wall sections approximate generally the cylindrical or oblong curved shape of the housing cover.

According to the invention, a small angular adjustment of the adjustable vanes eliminates one revolution of crop movement in the separating section of the rotor housing, i.e., advancing the adjusting vanes rearward provides a shortcut for the crop to skip one fixed helical revolution through the paths defined by the fixed vanes.

This adjustment reduces straw damage in the separator section by a significant amount. As an example, in the case where there are six fixed vanes in the separating section, by adjusting the adjustable vanes, the crop will only pass by five fixed vanes. Such adjustment could lower crop damage 15%. Adjustable vanes allow the farmer or operator to fine-tune the harvesting process to balance grain loss with straw damage to meet individual requirements.

Numerous other advantages and features of the present invention will be become readily apparent from the following detailed description of the invention and the embodiments thereof, and from the accompanying drawings.

DETAILED DESCRIPTION OF THE PREFERRED EMBODIMENTS

Figure 1:
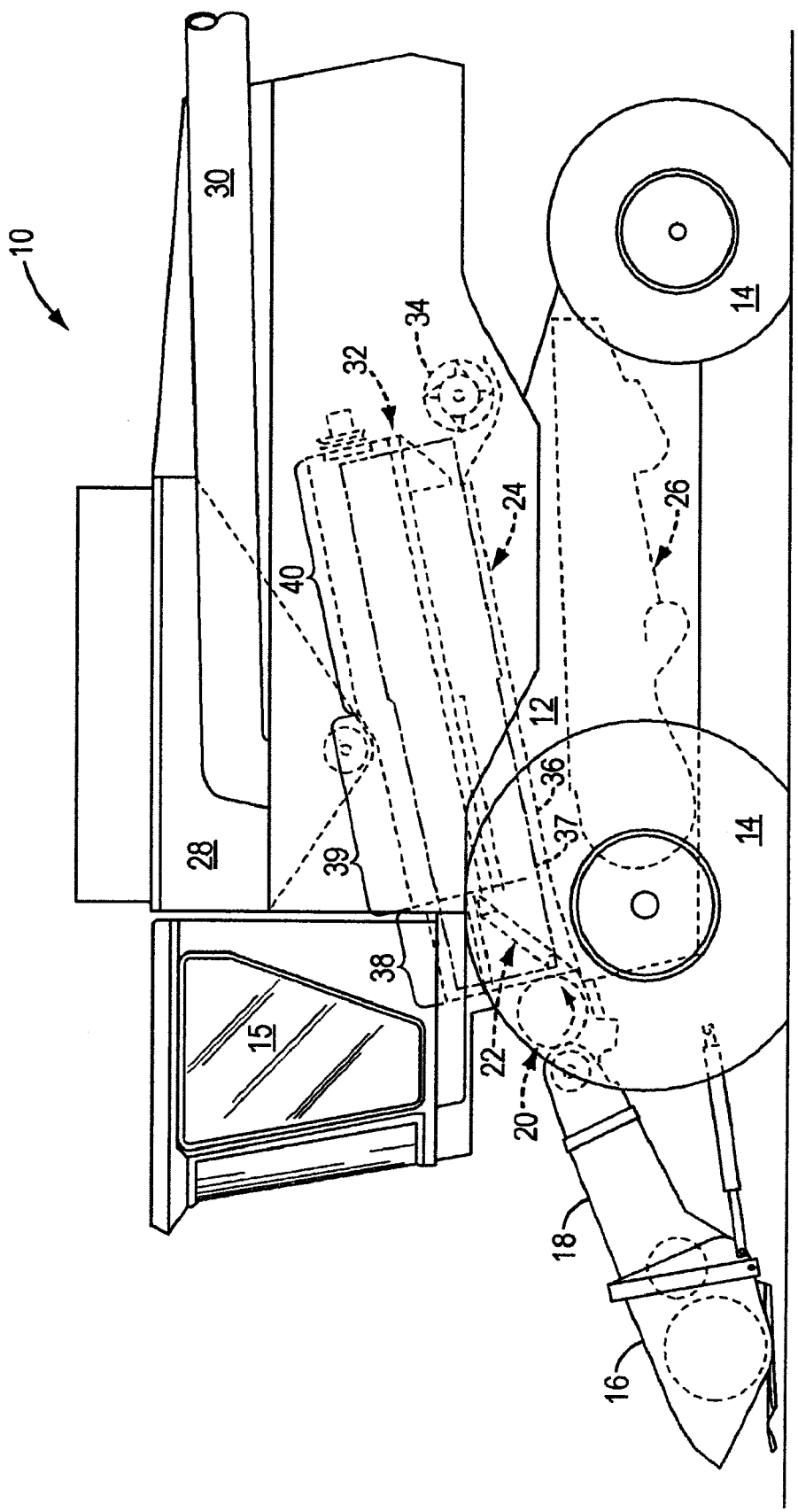
FIG. 1 is a diagrammatic side view of an agricultural combine the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application is a continuation of U.S. application Ser. No. 11/982,416, filed on Oct. 31, 2007 which is herein incorporated by reference.

FIG. 1 shows an agricultural combine 10 comprising a supporting structure 12 having ground engaging wheels 14 extending from the supporting structure. The operation of the combine is controlled from operator's cab 15. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit 24 threshes and separates the harvested crop material. Grain and chaff fall through grates on the bottom of the unit 24 to the cleaning system 26. The cleaning system 26 removes the chaff and directs the clean grain to a clean grain elevator (not shown). The clean grain elevator deposits the clean grain in grain tank 28. The clean grain in the tank 28 can be unloaded into a grain cart or truck by unloading auger 30. Threshed and separated straw is discharged from the axial crop processing unit 24 through outlet 32 to discharge beater 34. The discharge beater 34 in turn propels the straw out the rear of the combine.

Figure 2:
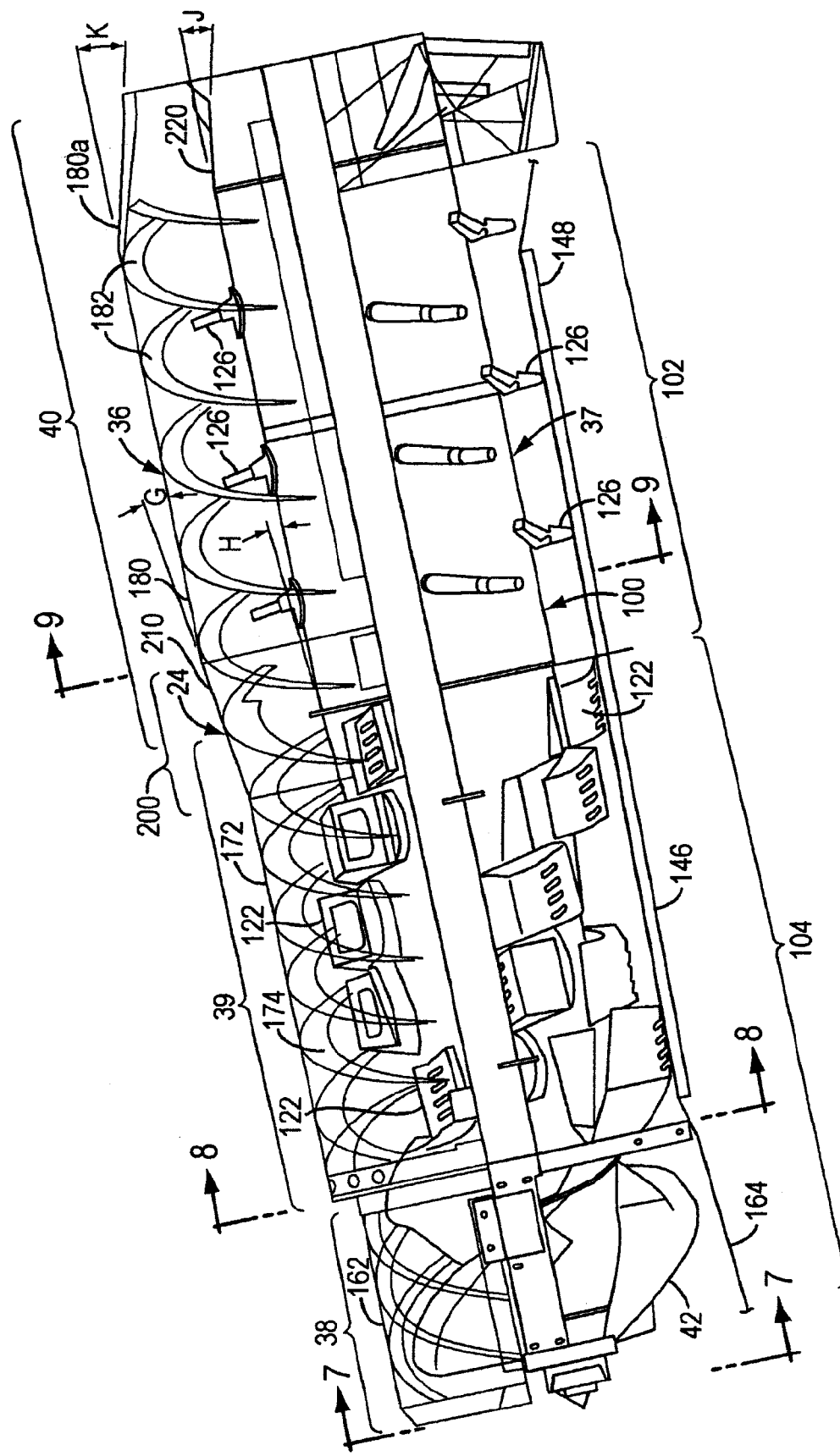
FIG. 2 is a diagrammatic side view of a crop processing unit taken from the combine shown in FIG. 1.

As illustrated in FIG. 2, the axial crop processing unit 24 comprises a rotor housing 36 and a rotor 37 located inside the housing 36. The front part of the rotor 37 and the rotor housing 36 define the infeed section 38 of the crop processing unit. Longitudinally downstream from the infeed section 38 are threshing section 39 and separating section 40. The rotor 37 comprises a drum 100 to which crop processing elements for the infeed section, threshing section, and separating section are affixed. The drum 100 comprises a rearward cylindrical portion 102 and a forwardly extending frusto-conical portion 104.

The rotor 37 shown in FIG. 2 is similar to the rotor explained in more detail in U.S. Pat. No. 7,070,498, herein incorporated by reference. However, in contrast to the rotor shown in U.S. Pat. No. 7,070,498, the rotor 37 within the threshing section 39 includes a long tapered profile throughout the threshing section 39 without the cylindrical portion within the threshing section as described in U.S. Pat. No. 7,070,498.

The rotor 37 in the infeed section 38 is provided with helical infeed elements 42 located on the frusto-conical portion of the drum 100. The helical infeed elements 42 engage harvested crop material received from the beater 20 and inlet transition section 22.

In the threshing section 39 the rotor 37 is provided with a number of threshing elements 122 for threshing the harvested crop material received from the infeed section 38.

The separating section 40 of the rotor includes outwardly projecting tines 126 similar to the tines disclosed in FIGS. 11 and 12 of U.S. Pat. No. 5,112,279, herein incorporated by reference.

The threshing section 39 of the rotor housing is provided with a concave 146 and the separating section 40 is provided with a grate 148. Grain and chaff released from the crop mat falls through the concave 146 and the grate 148. The concave and grate prevent the passage of crop material larger than grain or chaff from entering the cleaning system 26.

The rotor is axially arranged in the combine and defines a central rotor axis RA. The rotor axis RA is a straight line passing through the infeed, threshing and separating portions of the rotor.

Figure 7:
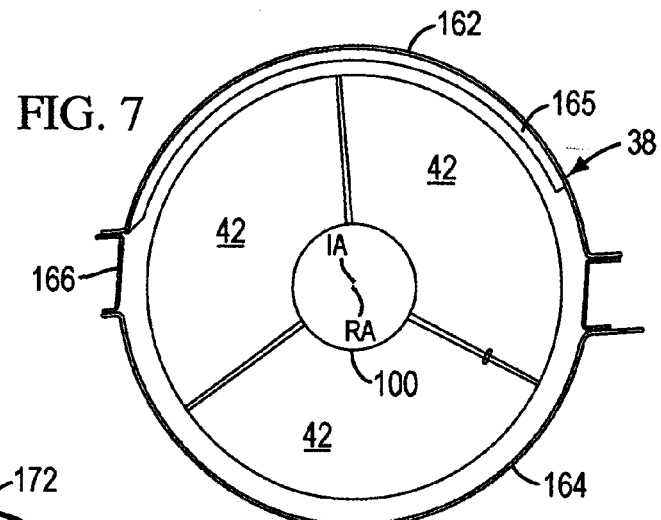
FIG. 7 is a sectional view taken generally along line 7-7 of FIG. 2.

As seen in FIG. 7, the infeed section 38 of the rotor housing 36 is provided with a closed cover 162 and a closed bottom 164. The cover 162 is provided with helical indexing vanes 165. The cover and bottom are bolted to axial rails 166 and 168. The forward portion of the closed bottom 164 is provided with an inlet transition section which is similar to one of those disclosed in U.S. Pat. Nos. 7,070,498 or 5,344,367, herein incorporated by reference.

The closed cover 162 of the infeed section 38 defines an infeed axis IA. The infeed axis IA is parallel to and substantially collinear with the rotor axis RA defined by the rotor. As such, the infeed portion of the rotor is substantially concentrically arranged in the infeed section 38 of the rotor housing as defined by the cover 162.

Figure 8:
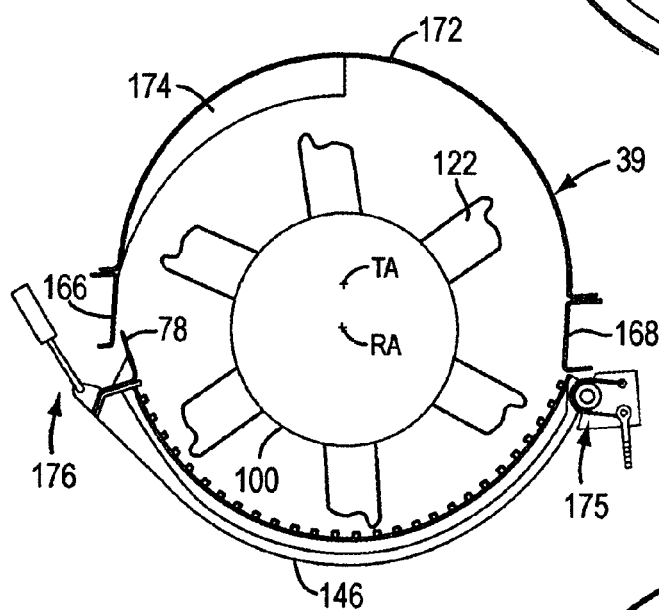
FIG. 8 is a sectional view taken generally along line 8-8 of FIG. 2.
Figure 9:
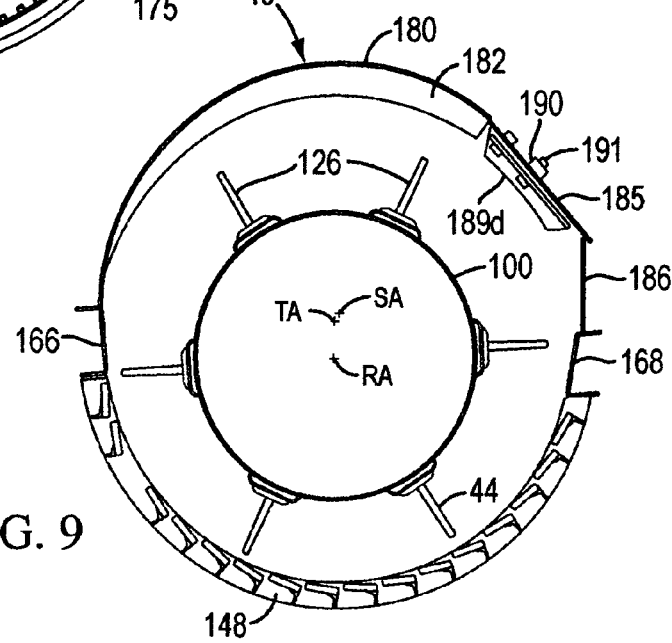
FIG. 9 is a sectional view taken generally along line 9-9 of FIG. 2.

As seen in FIG. 8, the threshing section 39 is provided with a closed threshing cover 172 having helical vanes 174. The cover is bolted to axial rails 166 and 168. The concave 146 is pivotally mounted to the frame of the combine below rail 168 at 175. An adjustment assembly 176 for adjusting concave clearance is mounted to the frame of the combine below rail 166. The concave 146 is provided with a closed extension 78.

The threshing cover 172 defines a threshing axis TA that is parallel to the rotor axis RA. The threshing axis is located above the rotor axis RA. In addition, the threshing axis is slightly offset to the side of the rotor axis in a downstream direction. As such, the cover of the threshing section is eccentrically arranged relative to the threshing portion of the rotor.

The separating section 40 is provided with a separating cover 180 having helically arranged, fixed vanes 182. According to the preferred embodiment, the separating cover 180 has a complex cross-section that comprises a curved section 184 configured along an oblong curvature, and a contiguous first flat wall section 185 and a contiguous second flat wall section 186. The vanes 182 are curved and are fixedly mounted onto the curved section 184.

As illustrated in FIGS. 3-6, a plurality of adjustable vanes 188 are arranged on the first flat wall section 185. The vanes 188 each have an L-shaped cross section each having a flat base 189a and an upstanding leg 189b. The flat base 189a conforms to a surface of the first flat wall section 185. The flat base 189a of each adjustable vane 188 is pivotally attached to the first flat wall section 185 at pivot points 188a near trailing ends 188b thereof by use of a fastener or pin. The upstanding leg 189b of each adjustable vane 188 is in registry with a leading end 182a of one fixed vane 182. The leg 189b of each adjustable vane 188 has a curved edge 189d to match the edge curvature of the fixed vanes 182.

The adjustable vanes 188 are connected to an actuation mechanism 189 at a swing point 188c on the adjustable vane 188 that is spaced from the pivot point 188a. The actuation mechanism 189 comprises a bar 190 located outside the first flat wall 185 and connected to one, more than one, or preferably all of the vanes 188 at the swing points 188c by respective fasteners or pins 191. Each fastener or pin 191 penetrates through a respective curved slot 185*a* that is provided through the first flat wall section 185. The slots 185*a* allow for the swinging motion of the adjustable vanes 188 about their pivot points 188*a*. Each fastener or pin 191 slides through its respective curved slot 185*a*.

A force directed substantially along the longitudinal direction on the bar 190 causes a shifting of one, more than one, or preferably all of the adjustable vanes 188 about their respective pivot points 188*a*. The vanes can be shifted from a position corresponding to the helical path of the fixed vanes 182 (FIG. 5) to a position wherein the adjustable vanes 188 are rearwardly shifted (FIGS. 4 and 6) wherein some of the helical crop flow between the rotor and housing after passing between the vanes 188 will be deflected to skip some of the passages defined between the fixed vanes 182 the next pass around the housing and take a more direct route through the annular passage between the rotor and the housing, i.e., the crop material will make fewer helical rotations within the separating section of the rotor housing between the separating section inlet and outlet.

Figure 3:
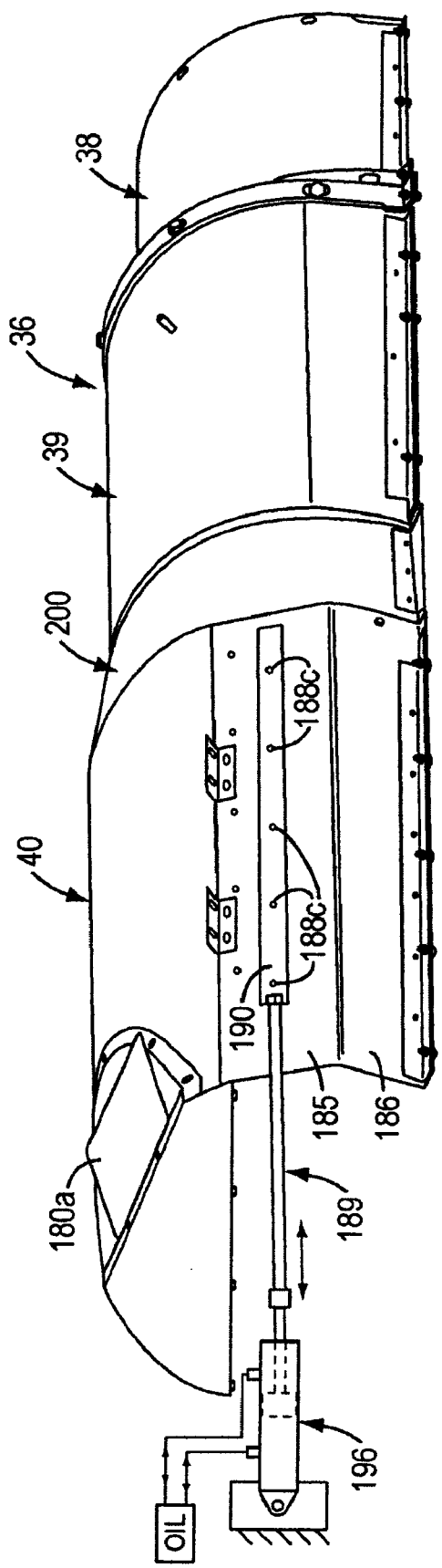
FIG. 3 is a perspective view of a cover for a crop processing unit of FIG. 2.
Figure 4:
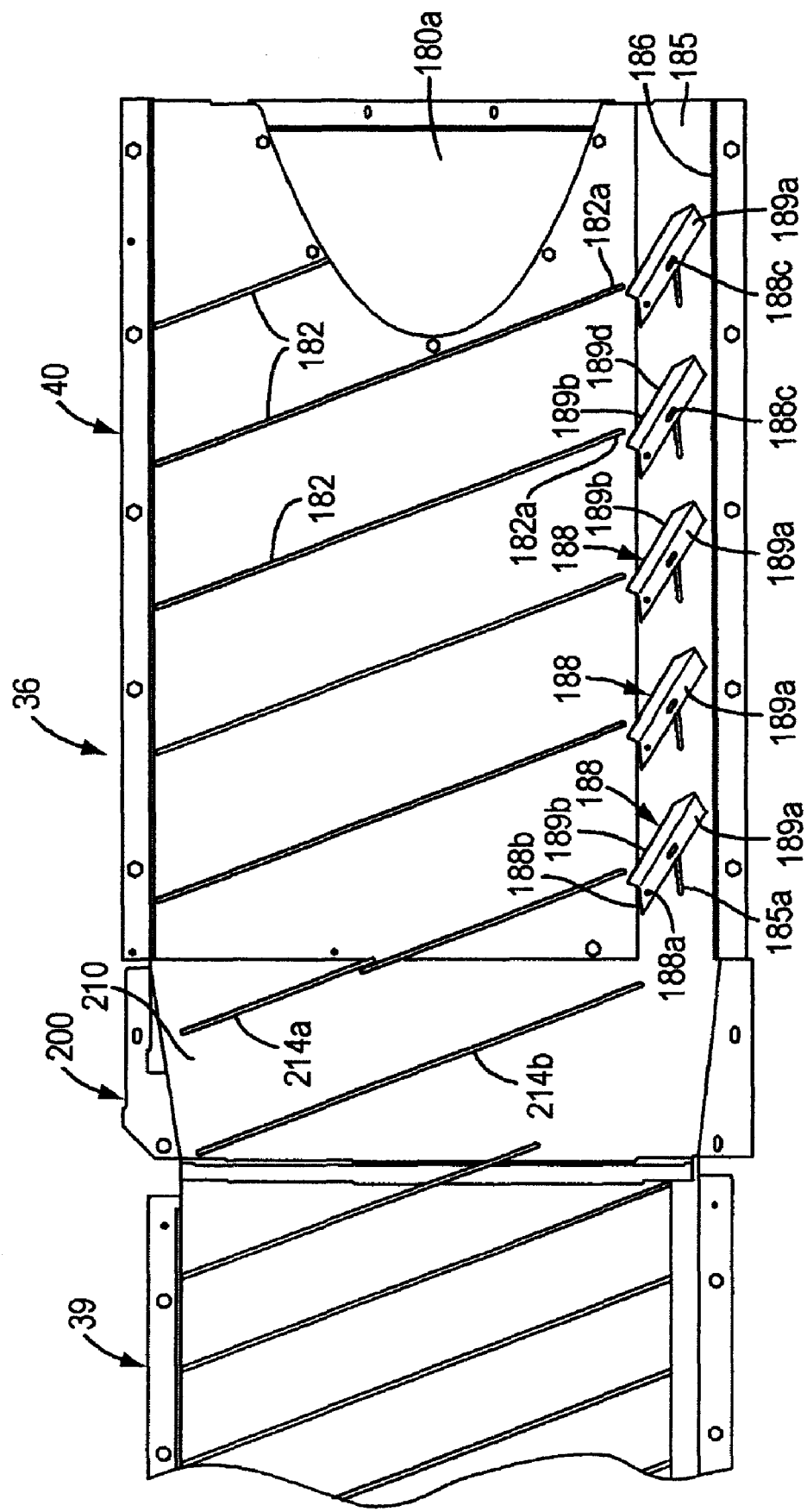
FIG. 4 is a bottom view of the cover shown in FIG. 3.
Figure 5:
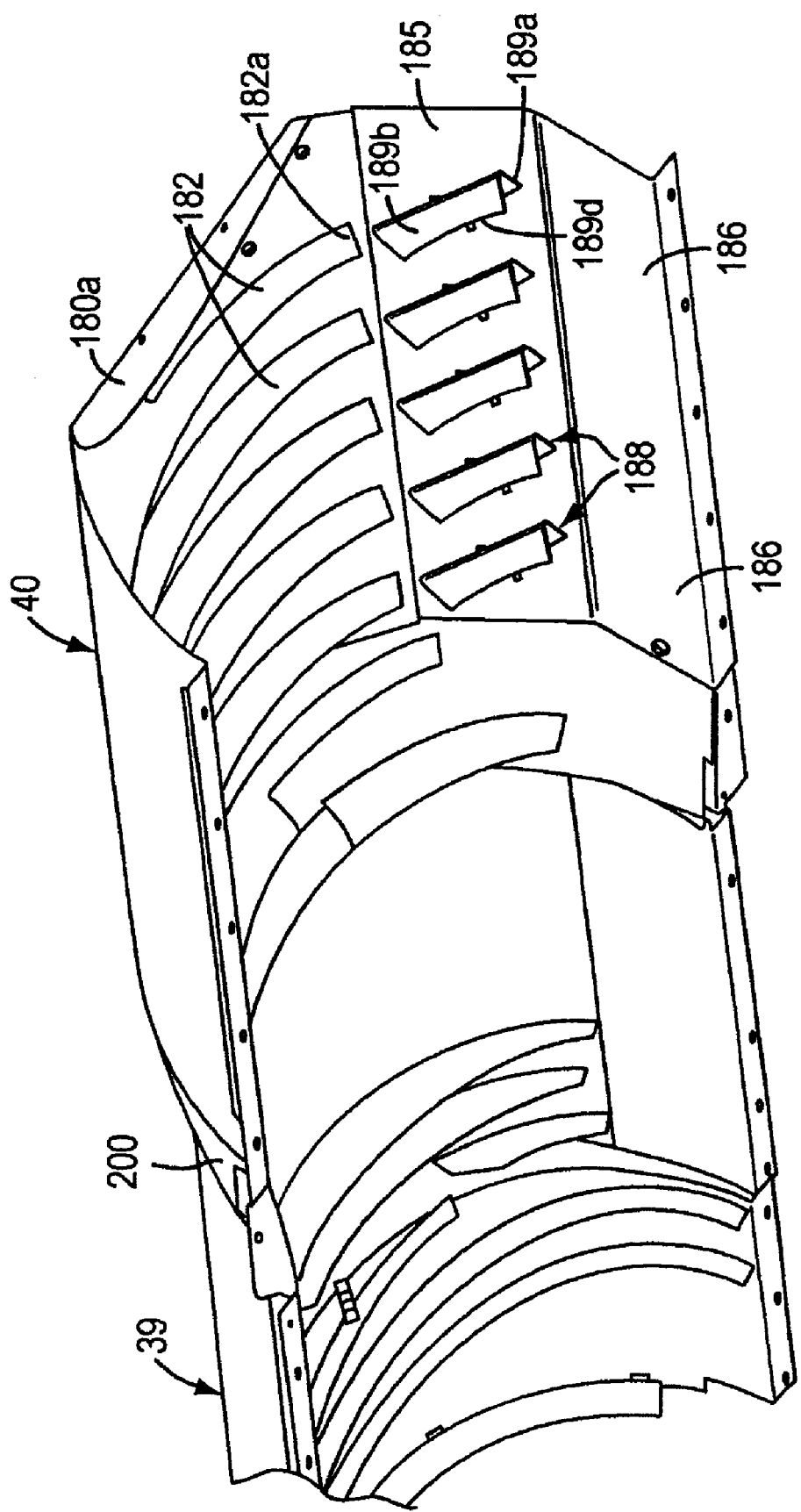
FIG. 5 is a bottom perspective view of the cover shown in FIG. 3.
Figure 6:
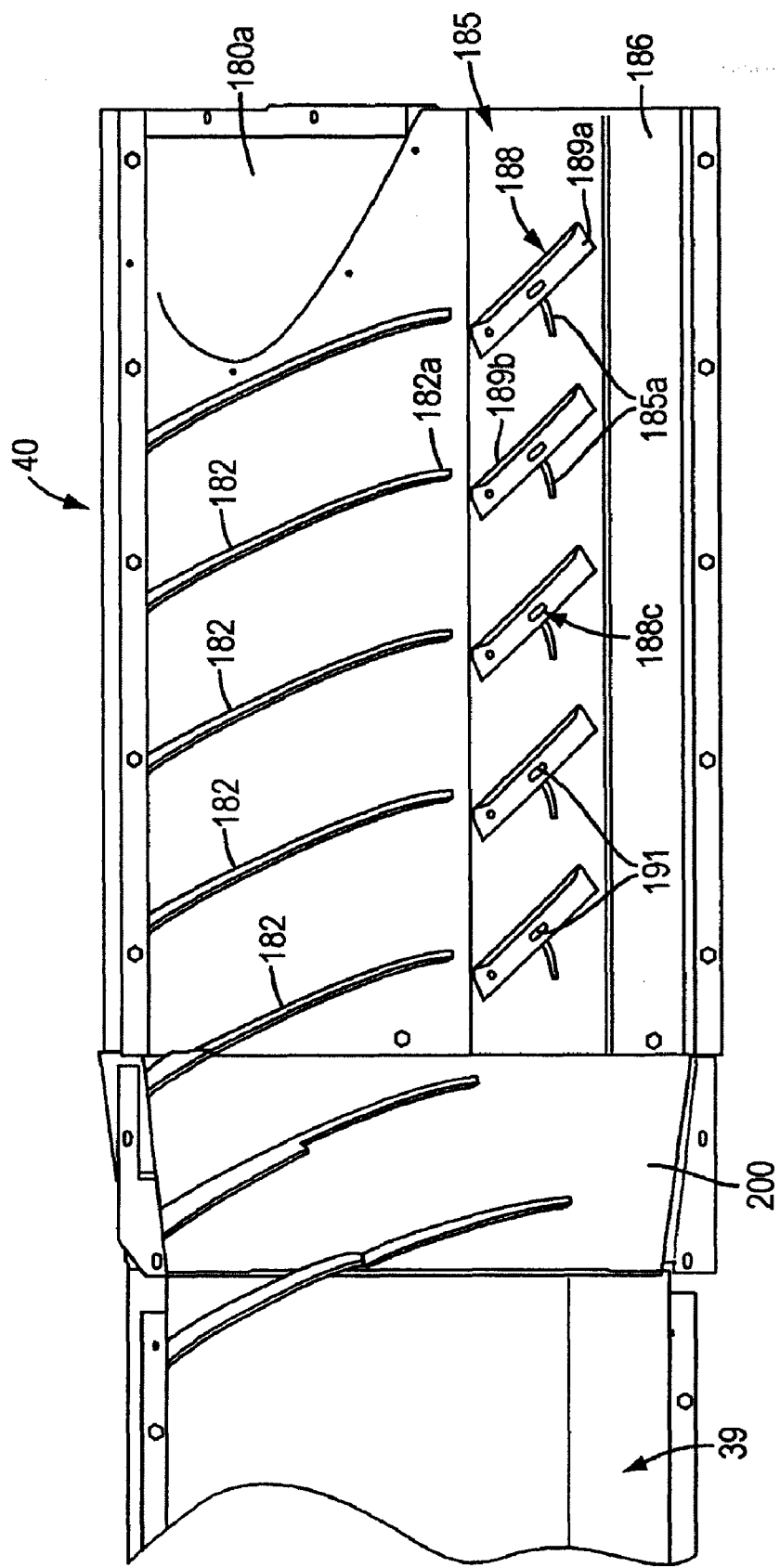
FIG. 6 is a further bottom perspective view of the cover shown in FIG. 3.

A motion actuator 196, such as a hydraulic cylinder, is shown diagrammatically in FIG. 3. The motion actuator can be a manual actuator, a pneumatic cylinder, a hydraulic cylinder, an electric linear actuator or any other known motion actuator. A powered motion actuator can be controlled from the operator cabin 15.

Because the adjustable vanes 188 are mounted to a flat wall section 185, changing the angle of the vanes 188 does not affect their close conformance to the surface of the flat wall section. Furthermore, the use of two contiguous flat wall sections 185, 186 together approximates the overall curved shape of the housing separating section so that no significant increase in flow resistance is realized.

It is also possible for a sensing means which detects the throughput of crop material to be provided within the separator section 40. The sensing means may be directly or indirectly connected to a sender which controls the actuation mechanism, so that, in the event of an overload of material in the apparatus, the actuation mechanism can adjust the vanes 188 in order thereby to increase the rate of throughput of crop material, at least temporarily.

The cover 180 is bolted to axial rails 166 and 168. Grate 148 is also bolted to rails 166 and 168. Grate 148 is similar to the grate disclosed in U.S. Pat. No. 4,875,891.

The separating cover 180 defines a separating axis SA that is parallel to the rotor axis RA. The separating axis is located above the rotor axis RA. In addition, the separating axis is offset to the side of the rotor axis in a downstream direction. As such, the cover of the separating section is eccentrically arranged relative to the separating portion of the rotor.

According to the preferred embodiment of the present invention, a frusto-conical transition section 200 is provided between the threshing section 39 and the separating section 40, overlapping each section.

The transition section 200 includes a cover 210 having a substantially frusto-conical curvature. The cover 210 includes vanes 214*a*, 214*b*. The vane 214*a* has a relatively wide width similar to the vanes 174 of the threshing section 39. The vane 214*a* is substantially continuous with the last vane 182*a* of the separating section 40. The vane 214*b* has a relatively wide width section 214*c* similar to the width of the vane 174 of the threshing section 39, and a relatively thinner width section 214*d* similar to the width of the vane 182 of the separating section 40.

Some rotors provided a further, reverse taper portion 220 of the rotor drum 100 at an outlet end of the processing unit 24 having an angle of taper "J." A deflecting plate 180*a* in the separator cover 180 can be arranged over the reverse taper portion 220 to provide for a smooth, energy-efficient flow of crop material.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. In an axial flow rotary separator for a combine, including a housing and a rotor rotatably mounted within the housing and carrying on its surface a plurality of material-treating and controlling elements, the housing being generally cylindrical in form and having a generally cylindrical wall with an upstream inlet end and a downstream outlet end, rotor and housing cooperating as the rotor rotates to process crop material introduced to the housing at the upstream end while transferring it to the downstream end, an adjustable vane system for controlling the axial progress of the crop material through the housing comprising:

said generally cylindrical wall of said housing comprising a curved section and a continuous first flat wall section;

a plurality of curved, helically arranged, fixed vanes conforming to an inside surface of the curved section and being raised generally radially inwards;

a plurality of spaced apart elongated adjustable vanes, each adjustable vane having a flat base conforming across the length of the flat base to the first flat wall section and being raised generally radially inwards from the first flat wall section and being disposed generally helically so as to engage crop material being propelled circumferentially by the rotor, the helical disposition being such that relative movement between the material and the adjustable vane deflects the material axially towards the outlet end of the housing, each adjustable vane including with respect to crop material circumferential movement, a leading end portion and a trailing end portion, one of the trailing end portion or the leading end portion being pivotally fixed at a pivot point to the first flat wall section and the respective other of the trailing end portion or the leading end portion being a swinging end movable in a swinging fashion as the adjustable vane pivots about the pivot point to set a vane angle of said adjustable vane so as to vary the effectiveness of the adjustable vane in deflecting crop material axially, said one of the trailing end portion or the leading end portion of each of said adjustable vanes that is pivotally fixed at a pivot point is adjacent to the an end of one of the fixed vanes.

2. The adjustable vane system of claim 1, including an actuation mechanism for controllably pivoting said vanes about said pivot points to set vane angles for the adjustable vanes.

3. The adjustable vane system of claim 2, further comprising a second flat wall section contiguous with said first flat wall section, said first and second flat wall sections approximating the curvature of said generally cylindrical wall of said housing.

4. The adjustable vane system of claim 3, wherein said second flat wall section is adjacent to an axial rail and said first flat wall section is between said second flat wall section and said curved section.

5. The adjustable vane system of claim 4, wherein said actuation mechanism comprises a bar mounted outside said flat wall section, and said flat wall section comprises curved slots adjacent to a lead end of each of said adjustable vanes, and a plurality of fastening elements, each fastening element connected to said bar and penetrating through each of said curved slots and connected to a respective adjustable vane at a distance from said pivot point of said respective adjustable vane.

6. The adjustable vane system of claim 1, including an actuation mechanism comprising a bar mounted outside said flat wall section, and said flat wall section comprises curved slots adjacent to the swinging end of each of said adjustable vanes, and a plurality of fastening elements, each fastening element connected to said bar and penetrating through each of said curved slots and connected to a respective adjustable vane at a distance from said pivot point of said respective adjustable vane.

7. The adjustable vane system of claim 1, further comprising a second flat wall section contiguous with said first flat wall section, said first and second flat wall sections approximating the curvature of said generally cylindrical wall of said housing.

8. The adjustable vane system of claim 7, wherein said second flat wall section is adjacent to an edge of said cover and said first flat wall section is between said second flat wall section and said curved section.

9. The adjustable vane system of claim 7, wherein each of said plurality of curved, helically arranged, fixed vanes has a leading end that is helically aligned with an adjacent trailing end of one of said adjustable vanes.

10. The adjustable vane system of claim 6, wherein each of said plurality of curved, helically arranged, fixed vanes has a leading end that is helically aligned with an adjacent trailing end of one of said adjustable vanes.

11. The adjustable vane system of claim 5, wherein each of said plurality of curved, helically arranged, fixed vanes has a leading end that is helically aligned with an adjacent trailing end of one of said adjustable vanes.

12. The adjustable vane system of claim 1, wherein each of said plurality of curved, helically arranged, fixed vanes has a leading end that is helically aligned with an adjacent trailing end of one of said adjustable vanes.

* * * * *